United States Patent [19]

Leytes et al.

[11] Patent Number: 4,690,165

[45] Date of Patent: Sep. 1, 1987

[54] MIXING TEE CHECK VALVE AND METHOD

[75] Inventors: Lev J. Leytes, Palo Alto; Harry A. Penhasi, Cupertino, both of Calif.

[73] Assignee: Beckman Instruments, Inc., Fullerton, Calif.

[21] Appl. No.: 898,867

[22] Filed: Aug. 20, 1986

Related U.S. Application Data

[63] Continuation of Ser. No. 676,126, Nov. 29, 1984, abandoned.

[51] Int. Cl.⁴ ............................................. F16K 15/14
[52] U.S. Cl. ................................ 137/112; 137/512.4; 137/853
[58] Field of Search ............... 137/112, 113, 114, 375, 137/454.2, 512.4, 843, 851, 852, 853, 855; 604/34, 247, 250

[56] References Cited

U.S. PATENT DOCUMENTS

| | | | |
|---|---|---|---|
| 2,684,049 | 7/1954 | Hollis | 137/853 X |
| 2,804,281 | 8/1957 | Osburn | 137/454.2 X |
| 2,993,654 | 7/1961 | Norton | 137/853 X |
| 3,369,496 | 2/1968 | Bushmeyer | 137/112 X |
| 3,403,693 | 10/1968 | Brandenberg | 137/112 |
| 3,416,567 | 12/1968 | Von Dardel et al. | 137/853 X |
| 3,534,767 | 10/1970 | Swinney | 137/375 |
| 3,610,698 | 10/1971 | Gachot | 137/113 X |

FOREIGN PATENT DOCUMENTS 986277  3/1965  United Kingdom ............... 137/843

Primary Examiner—Martin P. Schwadron
Assistant Examiner—Stephen M. Hepperle
Attorney, Agent, or Firm—William H. May; Steven R. Markl

[57] ABSTRACT

A mixing valve includes a housing having inlet ports and an outlet port that intersect at a valve chamber. A valve core within the valve chamber includes passages in fluid communication with the inlet and outlet ports. The passages intersect at a cavity within the valve core. An elastomeric seal retained within the cavity sealingly engages the valve core around the passages in the absence of fluid pressure in the inlets. Injection of a pressurized fluid in one of the inlets causes the seal to move away from both the corresponding inlet passage to permit fluid flow from the pressurized inlet port to the outlet port and compresses the seal around the other inlet port to provide a tighter seal than existed before application of pressure to the first port.

6 Claims, 5 Drawing Figures

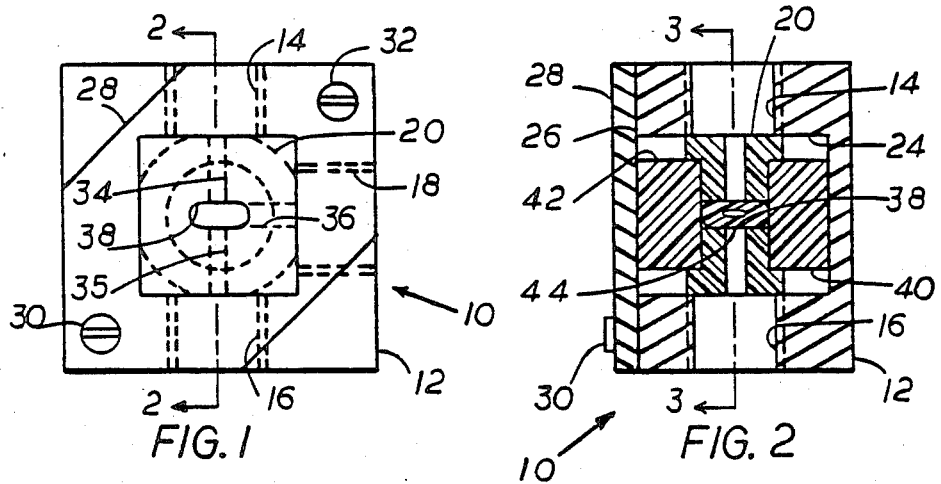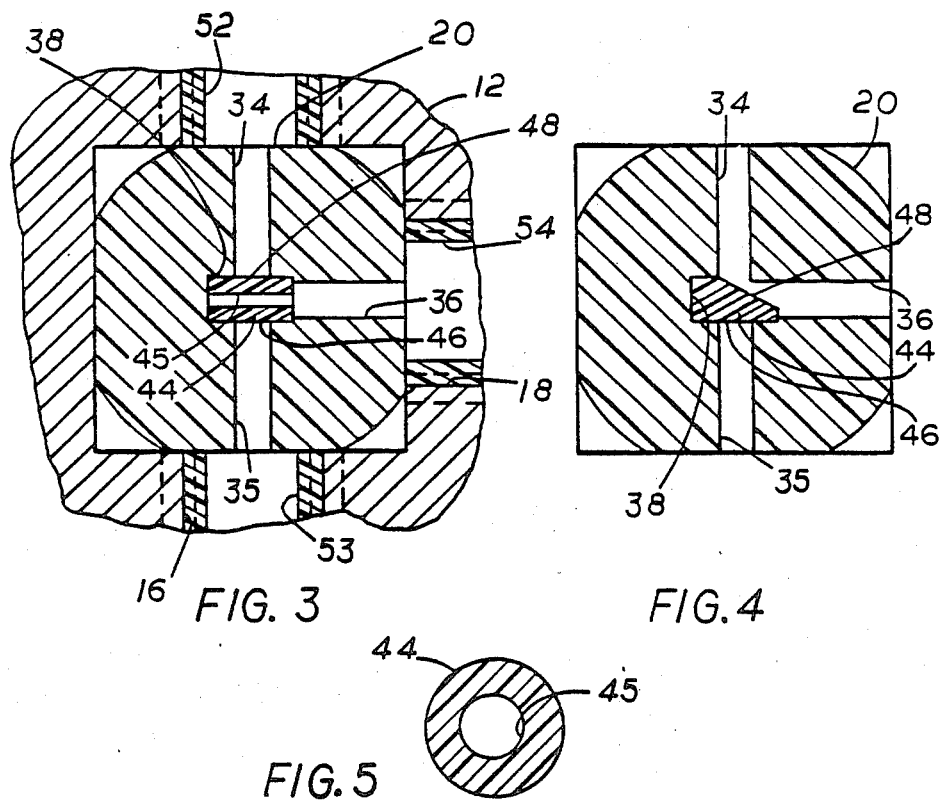

MIXING TEE CHECK VALVE AND METHOD

This is a continuation of application Ser. No. 676,126 filed Nov. 29, 1984 now abandoned.

BACKGROUND OF THE INVENTION

This invention relates generally to mixing valves with independent inlet ports that feed a common outlet and particularly to a fluid pressure actuated valve for mixing liquids in a DNA synthesizer and in other systems in which fluids are mixed.

Mixing valves with independent inlet ports feeding a common outlet are well-known. Prior mixing valves require either manual control or employ electrical or pneumatic actuators to control the positions of valve seals relative to corresponding valve seats to switch the valve between inlets. Manually controlled mixing valves are incompatible with the concept of modern automated systems. Prior electrically or pneumatically controlled mixing valves typically require secondary control circuits that must be either manually controlled or include secondary control system to insure proper operation. Such prior mixing valves are of necessity complicated and expensive, and they are often unreliable in providing the desired control of fluids to be mixed.

The electrically actuated mixing valves includes a compact solenoid operated mixing valve with a small dead volume. This device has the disadvantage of requiring an electrical signal for actuation, which creates the danger of fire or explosion when used to control the flow of highly flammable fluids. The control system for the solenoid is expensive and does not have the desired degree of reliability for use in analytical instrumentation.

A mixing control valve arrangement sometimes used in hydraulic drives of heavy machinery and equipment includes two ordinary check valves connected together with a T-shaped conduit. This arrangement is unsatisfactory for scientific analytical instrumentation because of the large dead volume in the conduit and the intermixing of the fluids in the two input legs.

SUMMARY OF THE INVENTION

The present invention overcomes the deficiencies of the prior art by providing a compact mixing valve that requires no expensive external control system, provides increased reliability of operation, has zero dead volume and that poses no safety hazard from fire, explosion or excessive pressure build-up.

The present invention includes a housing having at least two inlet ports and one outlet port that intersect at a valve chamber. A valve core within the valve chamber includes passages in fluid communication with the inlet and outlet ports. The passages intersect at a valve cavity within the valve core. An elastomeric seal is retained within the valve cavity and sealingly engaged with the portions of the valve core around the passages in the absence of fluid pressure in the inlets. Injection of a pressurized fluid in one of the inlets causes the seal to move away from both the corresponding inlet passage and the outlet passage so that the pressurized fluid flows from the pressurized inlet port to the outlet port. Application of a pressurized fluid to a first one of the inlet ports compresses the seal around the other inlet port to provide a tighter seal than existed before application of pressure to the first port.

The present invention includes a method of mixing fluids comprising the steps of forming a housing having at least a first inlet, a second inlet, and an outlet such that the first and second inlets and the outlet intersect at a valve chamber for selectively transferring fluids from one of the first and second inlets to the outlet; placing a pressure-controlled seal in the valve chamber to prevent fluid flow from the first and second inlets when the pressure in the first and second inlets is below a predetermined value; and pressurizing one of the first and second inlets with a fluid to break the seal between the pressurized inlet and the valve.

BRIEF DESCRIPTION OF THE DRAWINGS

FIG. 1 is a plan view of a mixing valve according to the present invention;

FIG. 2 is a cross sectional view of the mixing vlave of FIG. 1 taken along line 2—2;

FIG. 3 is a fragmentary cross sectional view taken along line 3—3 of FIG. 2;

FIG. 4 is a fragmentary view illustrating deformation of a seal included in FIGS. 1-3 when a pressurized fluid is applied to an inlet port; and FIG. 5 is an end view of a seal included in the mixing valve of FIGS. 1-4.

DESCRIPTION OF THE PREFERRED EMBODIMENT

Referring to FIGS. 1 and 2, a mixing valve 10 includes a housing 12 having, for example, a pair of inlets 14 and 16 and an outlet 18 therein. A valve core 20 is positioned in a chamber 22, which may be conveniently centrally positioned within the housing 12.

The housing 12 may be formed of any suitably rigid material by conventional techniques, such as casting, machining or molding to include the inlets 14 and 16 and the outlet 18. Although the valve core 20 is shown as a separate component of the valve 10, the core 20 may be integrally formed with the housing 12, in which case the housing 12 should be formed of a material that is chemically inert with respect to the fluids to be transferred with the valve 10.

The valve core 20 is inserted into the housing 12 through an opening 24, best shown in FIG. 2, at a side 26 of the housing 12. As shown in FIGS. 1 and 2, a cover 28 retains the valve core 20 within the chamber 22. A pair of screws 30 and 32 are suitable for retaining the cover upon the housing 12. The valve core 20 is dimensioned to fit within the chamber 22 so that when the cover 28 is secured to the housing 12, the valve core 20 is restrained against movement relative to the housing 12.

The valve core 20 includes a first passage 34 in fluid communication with the inlet 14, a second passage 35 in fluid communication with the inlet 16, and a third passage 36 in fluid communication with the outlet 18. The passages 34–36 intersect at a core cavity 38 that may be conveniently centrally located in the core 20. The core cavity 38 may be conveniently formed as a passage through the core 20. As shown in FIG. 2, a pair of plugs 40 and 42 seal opposite ends of the core cavity 38 to prevent undesired fluid flow therefrom. A seal 44 that is preferably formed of an inert elastomer is inserted into the core cavity 38 before the ends thereof are plugged. Referring to FIG. 5, the seal 44 is preferably tubular, having a void 45 therein, although other configurations, such as a hollow sphere, function satisfactorily. After the seal 44 and the plugs 40 and 42 are properly positioned, the cover 28 is secured to the housing to retain the plugs to complete the assembly of the valve 10. The plugs 40 and 42 retain the seal 44 therebetween so that the elastomeric seal 44 contacts the core 20 to seal the inlets 14, 16 and the outlet 18, as best shown in FIG. 3.

Referring to FIGS. 3 and 4, initially the elastic resilience of the seal causes both inlet ports 14 and 16 to be sealed. When a pressurized liquid is delivered to the inlet port 14, for example, the seal 44 has a side 48 that becomes exposed to fluid pressure. The side 48 deflects inwardly toward the hollow region of the tubular sea 44 away from sealing engagement with the inlet 14 and the outlet 18 to allow liquid to flow through the inlet 14 and the passage 34 into the core cavity 38 and out through the passage 36 to the outlet 18. For convenience of illustration, FIG. 4 shows the compression of the seal 44 as being linear. In actual practice the compression of the seal 44 could form a configuration different from that illustrated.

While pressurized fluid is applied to the side 48 of the seal 44, a side 46 of the seal opposite the side 48 becomes compressed against the portion of the core 20 around the passage 35 to tighten the seal to prevent cross leakage between the inlets 14 and 16.

Upon removal of fluid pressure from the side 48 of the seal 44, the seal 44 expands against the core 20 around the passage 34 to prevent fluid flow from the inlet 14 into the core cavity 38, thus terminating fluid flow between the inlet 14 and the outlet 18.

Application of fluid pressure to the side 46 of the seal through the inlet 16 and the passage 35 deforms the seal 44 away from engagement with the passage 35. If the pressure in the inlet 16 becomes sufficiently high, the seal disengages from the portion of the core 20 around the passage 35 to place the inlet 16 in fluid communication with the outlet 18.

Fluid pressure in the inlets 14 and 16 controls the entire operation of the valve 10. The valve 10 has no dead volume of fluid that remains to flow to the outlet 18 after the seal has closed one of the passages. The valve 10 prevents the accumulation of potentially dangerous pressures in the inlets 14, 16 and supply lines (not shown) that may be connected thereto because a sufficiently high pressure in an inlet will open the seal 44 to permit fluid flow and relief of the high fluid pressure. If both inlets 14 and 16 should become highly pressurized, the seal 44 will compress inwardly and permit fluid flow form both inlets 14 and 16 to the outlet 18.

Proper selection of the dimensions of the core cavity and the dimensions and the elasticity of the seal 44 provide control of the fluid pressure required to open the seal when one or both of the inlets 14, 16 are pressurized. It is also necessary that the materials that will become wetted with fluids being mixed in the valve 10 be inert to the fluids to be transferred through the valve 10. The necessity of using materials that are inert with respect to the fluids being transferred is well-known in the art and is also required with prior art mixing valves. There are many polymeric substances well-known in the art that are suitable for forming the wetted components of the valve 10, such as the interior of the inlets 14, 16, the outlet 18, the passages 34–36, the valve chamber 22, the core cavity 38, and the plugs 40, 42.

For illustration only rather than for limitation it has been found that certain materials provide satisfactory results in constructing the valve 10. For example, the core 20 may be satisfactorily formed of a fluoropolymer plastic material sold under the name KEL-F, a trademark of the 3M Company. The plugs 40, 42 may be formed of a fluorocarbon material sold under the name TEFLON, a trademark of E. I. Du Pont Nemours. The seal 44 may be formed of a perfluoroelastomer sold under the name KALREZ, a trademark of E. I. Du Pont Nemours. The seal 44 may also be formed of any other suitable elastomer and coated with teflon or other similar substance. The housing 12 may be formed of aluminum, in which case the inlets 14, 16 and the outlet 18 must include suitable fittings 52–54, respectively, that are inert to the fluids to be transferred. The fittings 52–54 may be threadedly engaged in the housing and should sealingly engage the core 20 to prevent leakage. The fittings may be secured in the housing by any other suitable means.

Although the present invention has been described with reference to a specific preferred embodiment, it is to be understood that modifications from the exemplary preferred embodiment may be made without departing from the scope and spirit of the invention as defined in the appended claims. Although the illustrated preferred embodiment includes two inlets and one outlet, it is contemplated that the valve 10 of the present invention could include any number of inlets and outlets.

What is claimed is:

1. A fluid mixing valve, comprising:
    a housing defining a central valve chamber, for connecting at least a pair of inlet ports with an outlet port, said inlet ports converging into said valve chamber substantially perpendicular to said outlet port;
    a valve core body having an exterior shape which conforms to the interior shape of said valve chamber and having passages aligned with said inlet and outlet ports and providing a conduit from said ports to a cavity in said valve core body which defines valve seats at the interior end of the passages within said cavity, said cavity adapted to receive valve seal means;
    a deformable valve seal means compressibly held within and substantially filling said cavity in said valve core body and sealing against said valve seats at the interior ends of said inlet ports closing said inlet ports to said outlet port in said valve core body when fluidic pressure in each of said inlet ports is less than a predetermined pressure, said seal means deforming in response to increase in fluidic pressure in either of said inlet ports to permit fluid communication through said cavity from the pressurized inlet port to said outlet port while sealing the other inlet port during fluid flow, said seal means recovering to substantially fill said cavity in said valve core body and seal against said valve seats at the interior ends of said inlet ports closing said inlet ports to said cavity and from each other when fluidic pressure is relieved in said inlet ports to a point below said predetermined pressure; and
    closure means for seating and enclosing said valve core body in the valve chamber in said housing.

2. A fluid mixture valve, comprising:
    a housing defining a central valve chamber, for connecting at least a pair of inlet ports with an outlet port, said inlet ports converging into said valve chamber substantially perpendicular to said outlet port;
    a valve core body having an exterior shape which conforms to the interior shape of said valve chamber and having passages aligned with said inlet and outlet ports and providing a conduit from said ports to a central cavity in said valve core body which defines valve seats at the interior end of the passages within said cavity, said central cavity adapted to receive valve seal means;

a deformable valve seal means compressibly held within and substantially filling said central cavity in said valve core body and sealing against said valve seats at the interior ends of said inlet ports closing said inlet ports to said central cavity in said valve core body when fluidic pressure in each of said inlet ports is less than a predetermined pressure, said seal means deforming in response to increase in fluidic pressure in said inlet ports to permit fluid communication through said central cavity from the pressurized inlet ports to said outlet port, said seal means recovering to substantially fill said cavity in said valve core body and seal against said valve seats at the interior ends of said inlet ports closing said inlet ports to said central cavity and from each other when fluidic pressure is relieved in said inlet ports to a point below said predetermined pressure; and closure means for seating and enclosing said valve core body in the valve chamber in said housing.

3. The fluid mixing valve of claim 1 or 2 wherein said element made of an elastomeric material and valve seal means comprises a compressible hollow element responsive to fluidic pressure on the exterior thereof.

4. The fluid mixing valve of claim 3 wherein said valve seal means has a tubular configuration with closed ends.

5. The fluid mixing valve of claim 1 or 2 wherein said valve seal means has a general configuration conforming to the interior shape of said central cavity in the valve core body.

6. The fluid mixing valve of claim 1 or 2 additionally comprising means for compressing said means to form a fluid tight seal for said inlet ports including plugs positioned in opposing relation to said valve seal means and maintained in compression with said seal means within said valve chamber by said closure means.

* * * * *